United States Patent
Horihata

(10) Patent No.: US 8,716,983 B2
(45) Date of Patent: May 6, 2014

(54) VEHICLE-USE ELECTRIC ROTATING MACHINE

(75) Inventor: Harumi Horihata, Nagoya (JP)

(73) Assignee: Denso Corporation, Kariya (JP)

( * ) Notice: Subject to any disclaimer, the term of this patent is extended or adjusted under 35 U.S.C. 154(b) by 415 days.

(21) Appl. No.: 13/271,739

(22) Filed: Oct. 12, 2011

(65) Prior Publication Data

US 2012/0091973 A1 Apr. 19, 2012

(30) Foreign Application Priority Data

Oct. 15, 2010 (JP) ................................. 2010-232673

(51) Int. Cl.
*H02P 11/00* (2006.01)
(52) U.S. Cl.
USPC ............................................. 322/23; 322/37
(58) Field of Classification Search
USPC .......................................... 322/22, 23, 37, 59
See application file for complete search history.

(56) References Cited

U.S. PATENT DOCUMENTS

| | | | | |
|---|---|---|---|---|
| 8,541,988 B2* | 9/2013 | Horihata et al. | ................. | 322/21 |
| 8,547,071 B2* | 10/2013 | Horihata et al. | ................. | 322/21 |
| 8,570,004 B2* | 10/2013 | Asada et al. | .................... | 322/45 |
| 2008/0225565 A1 | 9/2008 | Tsujimoto et al. | | |

FOREIGN PATENT DOCUMENTS

| | | |
|---|---|---|
| JP | B2-4023353 | 12/2007 |
| JP | B2-4275704 | 6/2009 |
| JP | A-2010-110176 | 5/2010 |

\* cited by examiner

*Primary Examiner* — Nicholas Ponomarenko
(74) *Attorney, Agent, or Firm* — Oliff PLC

(57) ABSTRACT

A vehicle generator includes armature windings, rectifier module groups, an upper MOS on-timing determining section, a lower MOS on-timing determining section, a rotational speed calculating section, a target electrical angle setting section for setting a value of a target electrical angle, an upper MOS off-timing determining section, a lower MOS off-timing determining section, and drivers for driving high-side and low-side MOS transistors constituting upper and lower arms. The target electrical angle represents a margin period between when the low-side MOS transistor was turned off a half cycle ago and the moment when the lower arm on-period has ended. The upper MOS off-timing determining section and the lower MOS off-timing determining section set off timings of the MOS transistors such that the margin period is equivalent to the set value of the target electrical angle.

14 Claims, 11 Drawing Sheets

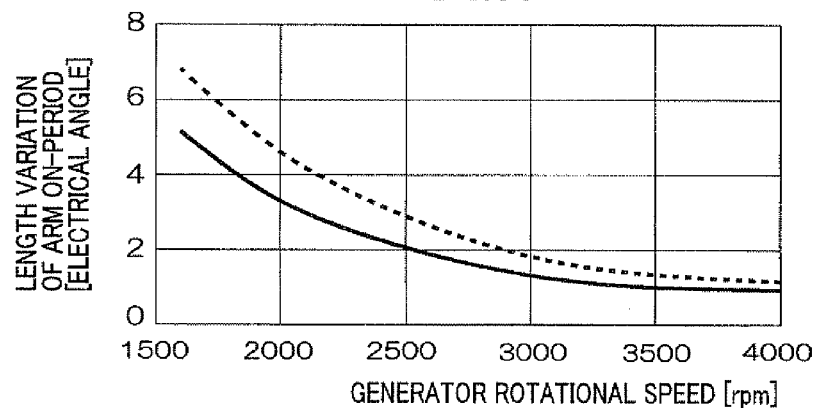
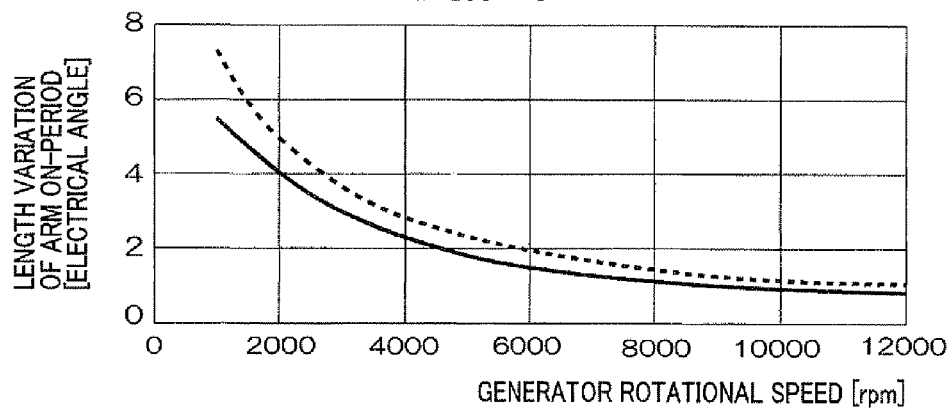
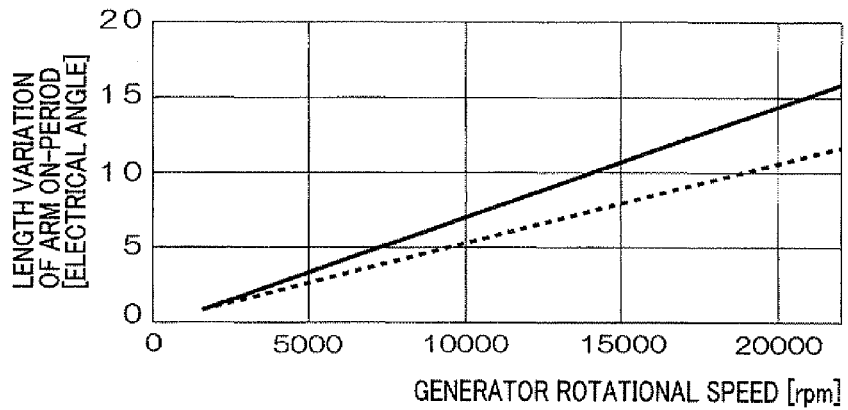

FIG.14

| COMPARISON RESULT | CASE 1<br>$T_{E/G} < \Delta T$ | CASE 2<br>$0 < \Delta T \leq T_{E/G}$ | CASE 3<br>$-T_{E/G} \leq \Delta T < 0$ | CASE 4<br>$\Delta T < -T_{E/G}$ |
|---|---|---|---|---|
| STATE | TFB1, TFB2<br>TARGET ELECTRICAL ANGLE<br>$\Delta T$<br>$T_{E/G}$<br>RAPID VEHICLE DECELERATION<br>RAPID INCREASE OF ELECRICAL LOAD | NORMAL STATE | NORMAL STATE | RAPID VEHICLE ACCELERATION<br>RAPID INCREASE OF ELECRICAL LOAD |
| CORRECTION | PREVIOUS OFF TIMING<br>$+\Delta T \times 1.0$<br>$(\alpha=1.0)$<br>$(\Delta T > 0)$ | PREVIOUS OFF TIMING<br>$+\Delta T \times 0.75$<br>$(\alpha=0.75)$<br>$(\Delta T > 0)$ | PREVIOUS OFF TIMING<br>$+\Delta T \times 1.0$<br>$(\alpha=1.0)$<br>$(\Delta T < 0)$ | PREVIOUS OFF TIMING<br>$+\Delta T \times 1.25$<br>$(\alpha=1.25)$<br>$(\Delta T < 0)$ |

VEHICLE-USE ELECTRIC ROTATING MACHINE

This application claims priority to Japanese Patent Application No. 2010-232673 filed on Oct. 15, 2010, the entire contents of which are hereby incorporated by reference.

BACKGROUND OF THE INVENTION

1. Field of the Invention

The present invention relates to an electric rotating machine mounted on a vehicle such as a passenger car or a truck.

2. Description of Related Art

There is known a vehicle generator provided with a power conversion apparatus including a power converting section having switching elements to rectify the output voltage of an armature winding of the vehicle generator. For example, refer to Japanese Patent No. 4275704. The power conversion apparatus described in this patent controls each of the switching elements such that a diode conduction state ends after lapse of a predetermined off-ensuring time from when the switching element is turned off, so that a current can be prevented from flowing to the armature winding from a vehicle battery.

The above power conversion apparatus is configured to store a timing at which a diode conduction state ends, and to turn on the switching element at a timing earlier than this stored timing by the off-ensuring time. However, this power conversion apparatus has a problem in that since a timing at which a diode conduction state ends varies significantly when a vehicle driver operates the accelerator pedal to accelerate the vehicle, or when electrical load increases sharply, there may occur a case where the switching element cannot be turned off at proper timings ensuring the off-ensuring time. It might occur that the off-ensuring time is set longer. However, in this case, since power loss increases, the power generation efficiency is lowered.

SUMMARY

An exemplary embodiment provides a vehicle-use electric rotating machine comprising:

an armature winding including two or more phase windings;

a switching section having a bridge circuit for rectifying a voltage induced in the armature winding, the bridge circuit including, for each of the phase windings, an upper arm and a lower arm each constituted of a switching element parallel-connected with a diode;

a rotational speed calculating section for calculating a rotational speed of the electric rotating machine;

an on timing setting section for setting an on timing of the switching element;

a target electrical angle setting section configured to set a value of a target electric angle, the target electrical angle representing in electrical angle a margin period between a time at which the switching element is turned off and a time at which a conduction period ends, the conduction period representing a period from when a phase voltage of one of the phase windings reaches a first threshold voltage to when the phase voltage reaches a second threshold voltage different from the first threshold voltage, an off timing setting section configured to set an off timing of the switching element such that the margin period is equivalent to the set value of the target electrical angle; and a switching element driving section configured to drive each of the switching elements such that the switching element is turned on at the timing set by the on timing setting section and turned off at the off timing set by the off timing setting section, wherein when a time difference represents a first electrical angle minus the target electrical angle, the first electrical angle representing a period in electrical angle from the previous off timing of the switching element to when the phase voltage has reached the second threshold voltage, the off timing setting section corrects, for each of the switching elements, the off timing of the switching element by a correction amount depending on the time difference, the off timing setting section being configured to set the correction amount to a larger value when the time difference is detected to be outside a normal range than when the time difference is detected to be within the normal range.

According to the exemplary embodiment, there is provided a vehicle-use electric rotating machine capable of setting off timings of the switching elements thereof properly depending on the running state and electrical load state of the vehicle.

Other advantages and features of the invention will become apparent from the following description including the drawings and claims.

BRIEF DESCRIPTION OF THE DRAWINGS

In the accompanying drawings:

FIG. 9 is a diagram showing an example of variation in electrical angle of the upper arm on-period and the lower arm on-period of the vehicle generator when there is pulsation in engine rotation;

FIG. 10 is a diagram showing an example of variation in electrical angle of the upper arm on-period and the lower arm on-period of the vehicle generator when electrical load changes abruptly;

FIG. 11 is a diagram showing an example of variation in electrical angle of the upper arm on-period and the lower arm on-period of the vehicle generator when there is turn-off delay in MOS transistors included in the rectifier module;

FIG. 14 is a diagram showing examples of setting of the correction coefficient α defined in the rectifier module of this embodiment;

PREFERRED EMBODIMENTS OF THE INVENTION

Figure 1:
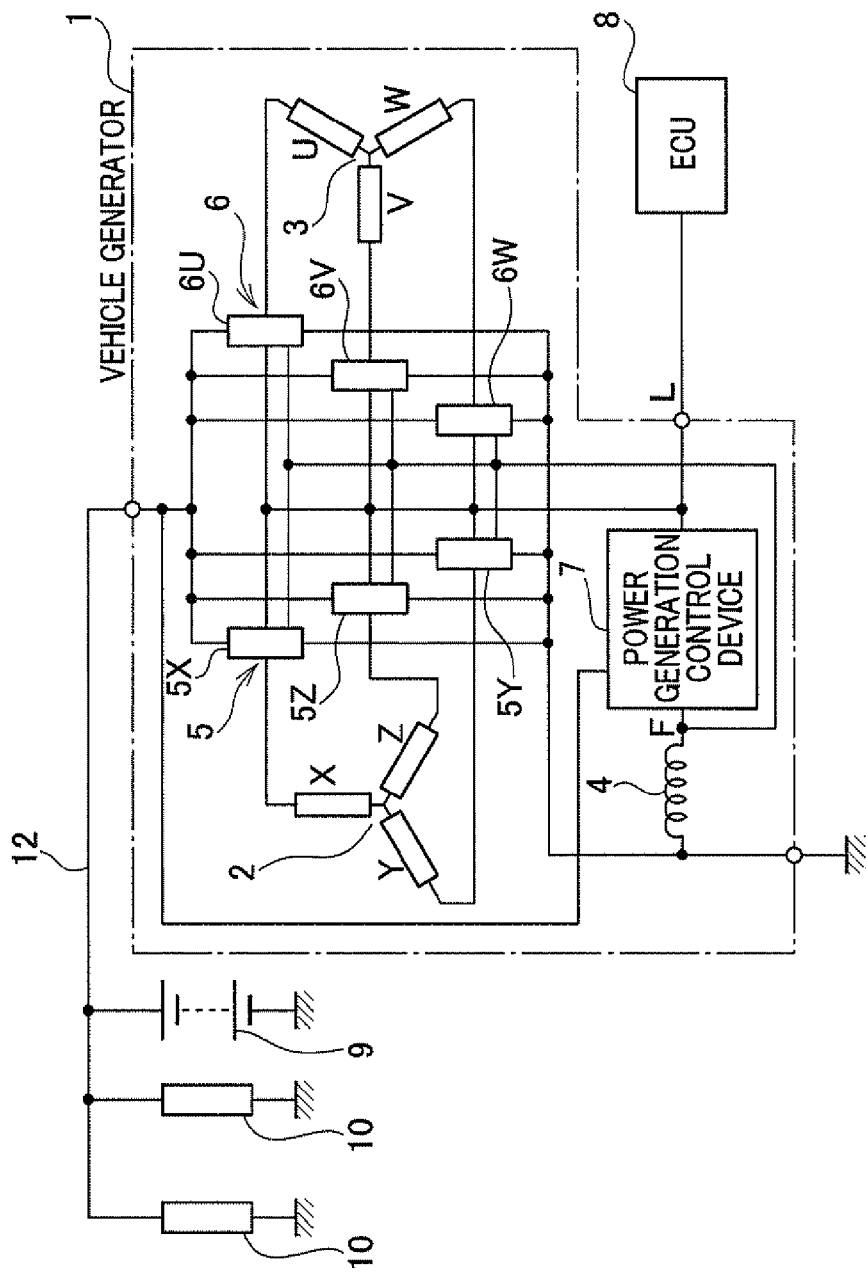
FIG. 1 is a diagram showing the structure of a vehicle generator as an embodiment of the invention.

FIG. 1 is a diagram showing the structure of a vehicle generator 1 as an embodiment of the invention. The generator 1 includes two stator windings (armature windings) 2 and 3, a field winding 4, two rectifier module groups 5 and 6, and a power generation control device 7. The two rectifier module groups 5 and 6 constitute a switching section.

The stator winding 2 is wound around a stator core (not shown) as a multi-phase winding (a three-phase winding including X-phase, Y-phase and Z-phase windings in this embodiment). The stator winding 3 is wound around the stator core as a multi-phase winding (a three-phase winding including U-phase, V-phase and W-phase windings in this embodiment). The stator windings 2 and 3 are located on the stator core so as to be shifted from each other by 30 degrees in electrical angle. The two stator windings 2 and 3 and the stator core constitute a stator.

The field winding 4 is wound around field poles disposed opposite to each other to constitute a rotor inside the stator core. By passing a current to the field winding 4, the field poles are magnetized. An AC voltage is induced in each of the stator windings 2 and 3 depending on the rotating field generated by the magnetized field poles.

The rectifier module group 5 is connected to the stator winding 2 so as to form a three-phase full-wave rectifier circuit (bridge circuit) for converting the AC voltage induced in the stator winding 2 into a DC voltage. The rectifier module group 5 includes rectifier modules 5X, 5Y and 5Z corresponding to the three phases of the stator winding 2. The rectifier module 5X is connected to the X-phase winding of the stator winding 2. The rectifier module 5Y is connected to the Y-phase winding of the stator winding 2. The rectifier module 5Z is connected to the Z-phase winding of the stator winding 2.

The rectifier module group 6 is connected to the stator winding 3 so as to form a three-phase full-wave rectifier circuit (bridge circuit) for converting the AC voltage induced in the stator winding 3 into a DC voltage. The rectifier module group 6 includes rectifier modules 6U, 6V and 6W corresponding to the three phases of the stator winding 3. The rectifier module 6U is connected to the U-phase winding of the stator winding 3. The rectifier module 6V is connected to the V-phase winding of the stator winding 3. The rectifier module 6W is connected to the W-phase winding of the stator winding 3.

The power generation control device 7, which is for controlling the excitation current passed to the field winding 4 through an F-terminal, controls the output voltage $V_B$ of the vehicle generator 1 (or the output voltage of each rectifier module) at a regulation voltage Vreg. For example, the power generation control device 7 operates to stop supply of the field current to the field winding 4 when the output voltage $V_B$ exceeds the regulation voltage Vreg, and resume supply of the field current to the field winding 4 when the output voltage $V_B$ decreases below the regulation voltage Vreg. The power generation control device 7 is connected to an external ECU 8 through a communication terminal L and a communication line to perform two-way serial communication with the ECU 8 to exchange communication messages.

Next, the detailed structure of the rectifier module 5X is explained with reference to FIG. 2.

Figure 2:
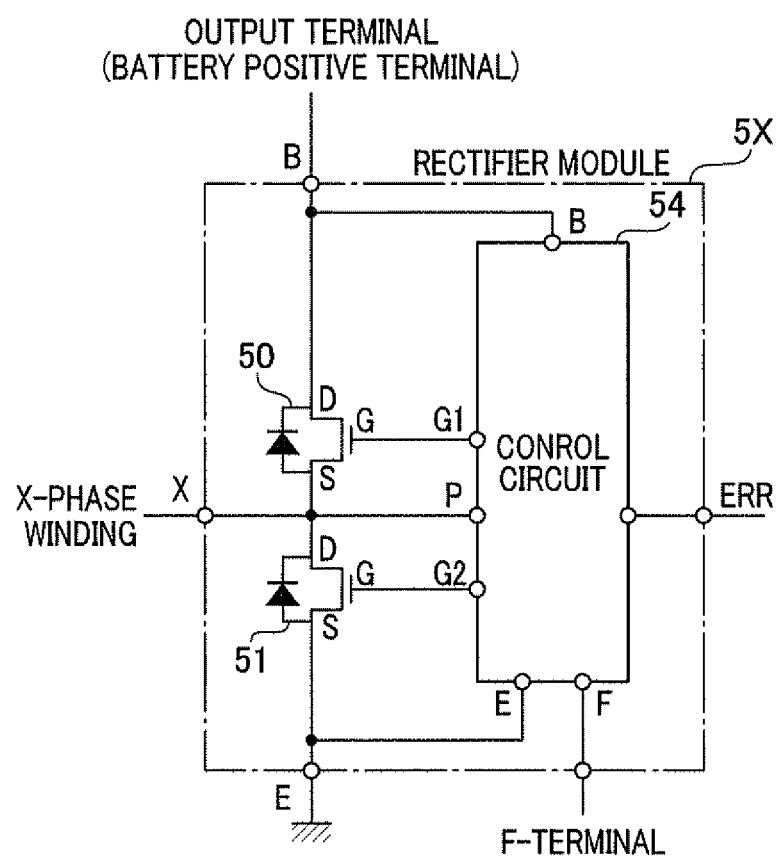
FIG. 2 is a diagram showing the structure of a rectifier module included in the vehicle generator.

FIG. 2 is a diagram showing the structure of the rectifier module 5X included in the vehicle generator shown in FIG. 1. The rectifier modules 5Y, 5Z, 6U, 6V and 6W have the same structure as that of the rectifier module 5X. As shown in FIG. 2, the rectifier module 5X includes two MOS transistors 50 and 51, and a control circuit 54. The MOS transistor 50, which serves as an upper arm (a high-side switching element), is connected to the X-phase winding of the stator winding 2 at its source, and connected to electrical load devices 10 and the positive terminal of a battery 9 at its drain through a charge line 12. The MOS transistor 51, which serves as a lower arm (low-side switching element), is connected to the X-phase winding of the stator winding 2 at its drain, and connected to the negative terminal of the battery 9 (the ground) at its source. The series circuit of the two MOS transistors 50 and 51 is connected across the positive and negative terminals of the battery 9, and the X-phase winding is connected to the connection node of the two MOS transistors 50 and 51. A diode is parallel-connected to the source-drain path of each of the MOS transistors 50 and 51. These diodes are implemented by parasitic diodes (body diodes) of the MOS transistors 50 and 51. However, discrete diodes may further parallel-connected respectively to the source-drain paths of the MOS transistors 50 and 51. At least one of the upper and lower arms may be constituted of a switching element other than a MOS transistor.

Figure 3:
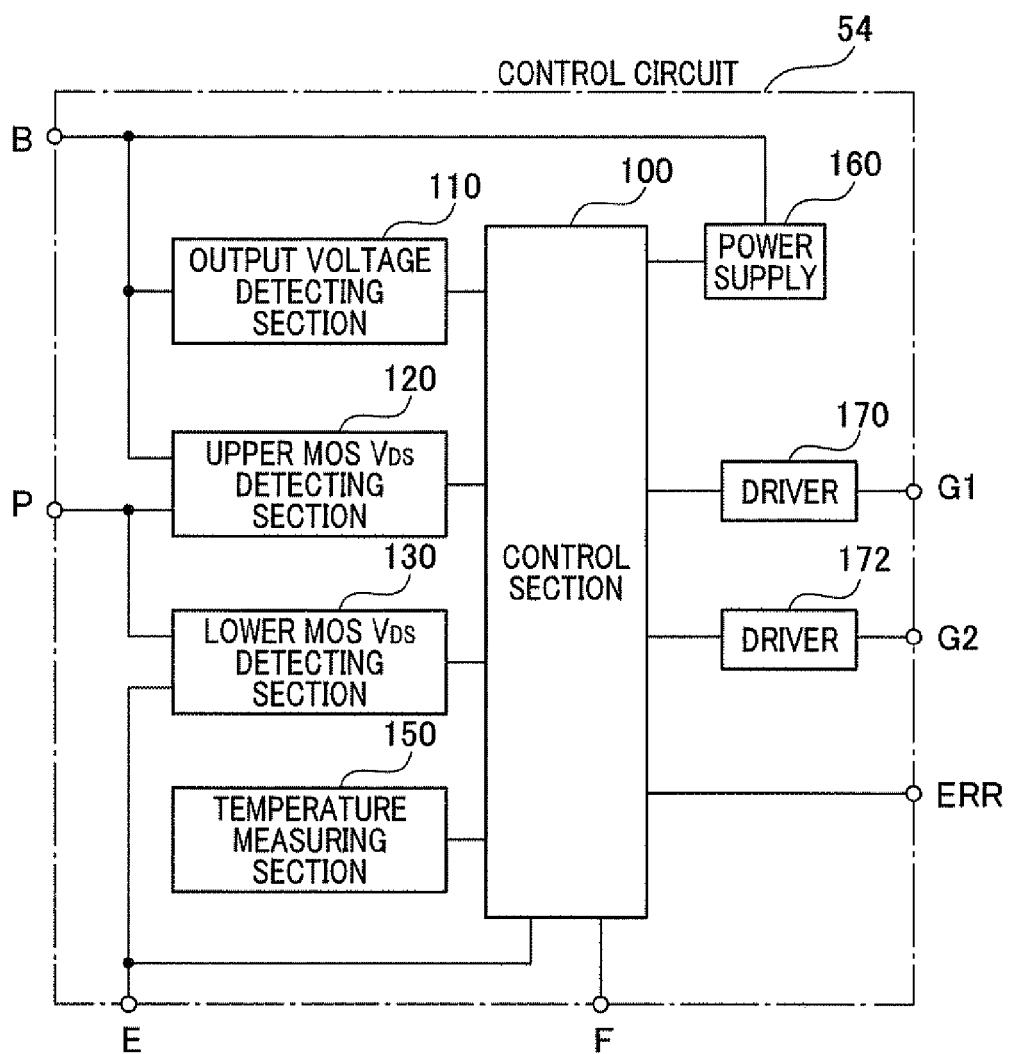
FIG. 3 is a diagram showing the structure of a control circuit included in the rectifier module.

FIG. 3 is a diagram showing the structure of the control circuit 54. As shown in FIG. 3, the control circuit 54 includes a control section 100, a power supply 160, an output voltage detecting section 110, an upper MOS $V_{DS}$ detecting section 120, a lower MOS $V_{DS}$ detecting section 130, a temperature detecting section 150 and drivers 170 and 172.

The power supply 160 is activated to start operation at a timing at which the power generation control device 7 supplies the excitation current to the field winding 4, and is deactivated to stop operation at a timing at which the power generation control device 7 stops supply of the excitation current to the field winding 4. The activation and deactivation of the power supply 160 is performed in accordance with a command outputted from the control section 100.

The driver 170, which is connected to the gate of the high-side MOS transistor 50 at its output terminal G1, generates a drive signal to turn on and off the MOS transistor 50. The driver 172, which is connected to the gate of the low-side MOS transistor 51 at its output terminal G2, generates a drive signal to turn on and off the MOS transistor 51.

The output voltage detecting section 110 is constituted of a differential amplifier and an A/D converter for converting the output of the differential amplifier into digital data indicative of the voltage of the output terminal (B-terminal) of the generator 1 (or the rectifier module 5X). The A/D converter may be disposed within the control section 100.

The upper MOS $V_{DS}$ detecting section 120 detects the drain-source voltage $V_{DS}$ of the high-side MOS transistor 50, compares the detected drain-source voltage $V_{DS}$ with a predetermined threshold value, and outputs a signal indicative of the comparison result.

Figure 4:
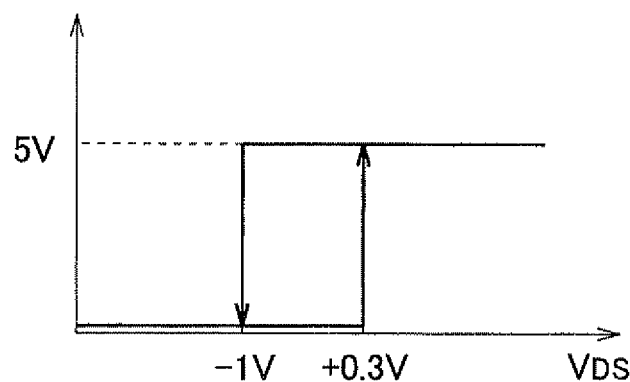
FIG. 4 is a diagram showing an example of voltage comparison by an upper MOS $V_{DS}$ detecting section included in the control circuit.

FIG. 4 is a diagram showing an example of the voltage comparison by the upper MOS $V_{DS}$ detecting section 120. In FIG. 4, the horizontal axis represent the drain-source voltage $V_{DS}$ with respect to the output voltage $V_B$ on the drain side, and the vertical axis represents the voltage level of the signal outputted from the upper MOS $V_{DS}$ detecting section 120. As shown in FIG. 4, when the phase voltage $V_P$ exceeds the output voltage $V_B$ by more than 0.3 V, since the voltage $V_{DS}$ increases above 0.3 V, the output signal of the upper MOS $V_{DS}$ detecting section 120 changes from the low level (0 V) to the high level (5 V). Thereafter, when the phase voltage $V_P$ drops below the output voltage $V_B$ by more than 1.0V, since the voltage $V_{DS}$ decreases below −1.0 V, the output signal of the upper MOS $V_{DS}$ detecting section 120 changes from the high level to the low level.

In this embodiment, the voltage V10 higher than the output voltage $V_B$ by 0.3 V (see FIG. 7) is set as a first threshold voltage. The first threshold voltage, which is for reliably detecting the start of a diode conduction period, is set to a voltage higher than the output voltage $V_B$ plus the drain-source voltage $V_{DS}$ of the MOS transistor 50 in the on state, and lower than the output voltage $V_B$ plus the forward voltage VF of the diode parallel-connected to the MOS transistor 50. Further, the voltage V20 lower than the output voltage $V_B$ by 1.0 V (see FIG. 7) is used as a second threshold voltage. The second threshold voltage, which is for reliably detecting the end of a diode conduction period, is set to a voltage lower than the output voltage $V_D$. Here, a period from when the phase voltage $V_P$ reaches the first threshold voltage to when the phase voltage $V_P$ reaches the second threshold voltage is referred to as "on-period" of the upper arm. The on-period is different from, in the start timing and end timing, the diode conduction period during which a current actually flows through the diode when the MOS transistor 50 is in the off state. However, the synchronous control explained later is performed based on this on-period.

The lower MOS $V_{DS}$ detecting section 130 detects the drain-source voltage of the low-side MOS transistor 51, compares the detected drain-source voltage with a predetermined threshold value, and outputs a signal indicative of the comparison result.

Figure 5:
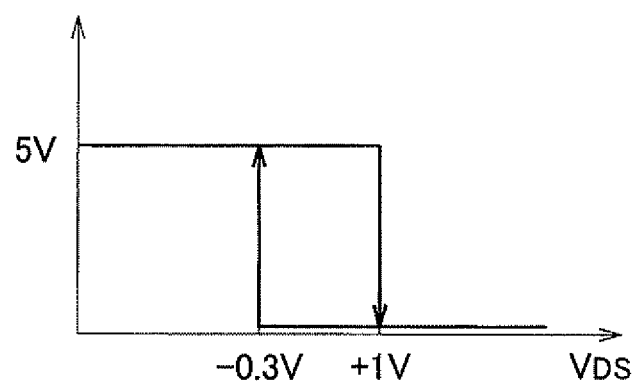
FIG. 5 is a diagram showing an example of voltage comparison by a lower MOS $V_{DS}$ detecting section included in the control circuit.

FIG. 5 is a diagram showing an example of the voltage comparison by the lower MOS $V_{DS}$ detecting section 130. In FIG. 5, the horizontal axis represent the drain-source voltage $V_{DS}$ with respect to the ground voltage $V_{GND}$ equal to the voltage of the battery negative terminal, and the vertical axis represents the voltage level of the signal outputted from the lower MOS $V_{DS}$ detecting section 130. As shown in FIG. 5, when the phase voltage $V_P$ drops below the ground voltage $V_{GND}$ by more than 0.3 V, since the voltage $V_{DS}$ decreases below −0.3 V, the output signal of the lower MOS $V_{DS}$ detecting section 130 changes from the low level (0 V) to the high level (5 V). Thereafter, when the phase voltage $V_P$ increases above the ground voltage $V_{GND}$ by more than 1.0 V, since the voltage $V_{DS}$ increases above 1.0 V, the output signal of the lower MOS $V_{DS}$ detecting section 130 changes from the high level to the low level.

In this embodiment, the voltage V11 lower than the ground voltage $V_{GND}$ by 0.3 V (see FIG. 7) is set as a first threshold voltage. The first threshold voltage, which is for reliably detecting the start of a diode conduction period, is set to a voltage lower than the ground voltage $V_{GND}$ minus the drain-source voltage $V_{DS}$ of the MOS transistor 51 in the on state, and higher than the ground voltage $V_{GND}$ minus the forward voltage VF of the diode parallel-connected to the MOS transistor 51. Further, the voltage V21 higher than the output voltage $V_B$ by 1.0 V (see FIG. 7) is used as a second threshold voltage. The second threshold voltage, which is for reliably detecting the end of a diode conduction period, is set to a voltage higher than the ground voltage $V_{GND}$. Here, a period from when the phase voltage $V_P$ reaches the first threshold voltage to when the phase voltage $V_P$ reaches the second threshold voltage is referred to as "on-period". The on-period is different from, in the start timing and end timing, the diode conduction period during which a current actually flows through the diode when the MOS transistor 51 is in the off state. However, the synchronous control explained later is performed based on this on-period.

The temperature detecting section 150 is constituted of a diode disposed in the vicinity of the MOS transistors 50 and 51 or the control section 100, and an A/D converter for converting the forward voltage of the diode into digital data. Since the forward voltage of the diode is temperature-dependent, it is possible to determine the temperature in the vicinity of the MOS transistors 50 and 51 or the control section 100 based on the forward voltage. The A/D converter or whole of the temperature detecting section 150 may be disposed within the control section 100.

The control section 100 is configured to determine a timing to start synchronous rectification, set on/off timings of the MOS transistors 50 and 51 to perform the synchronous rectification, drive the drivers 170 and 172 in accordance with the on/off timings of the MOS transistors 50 and 51, determine a timing to shift to load dump protection operation, and perform the protection operation.

Figure 6:
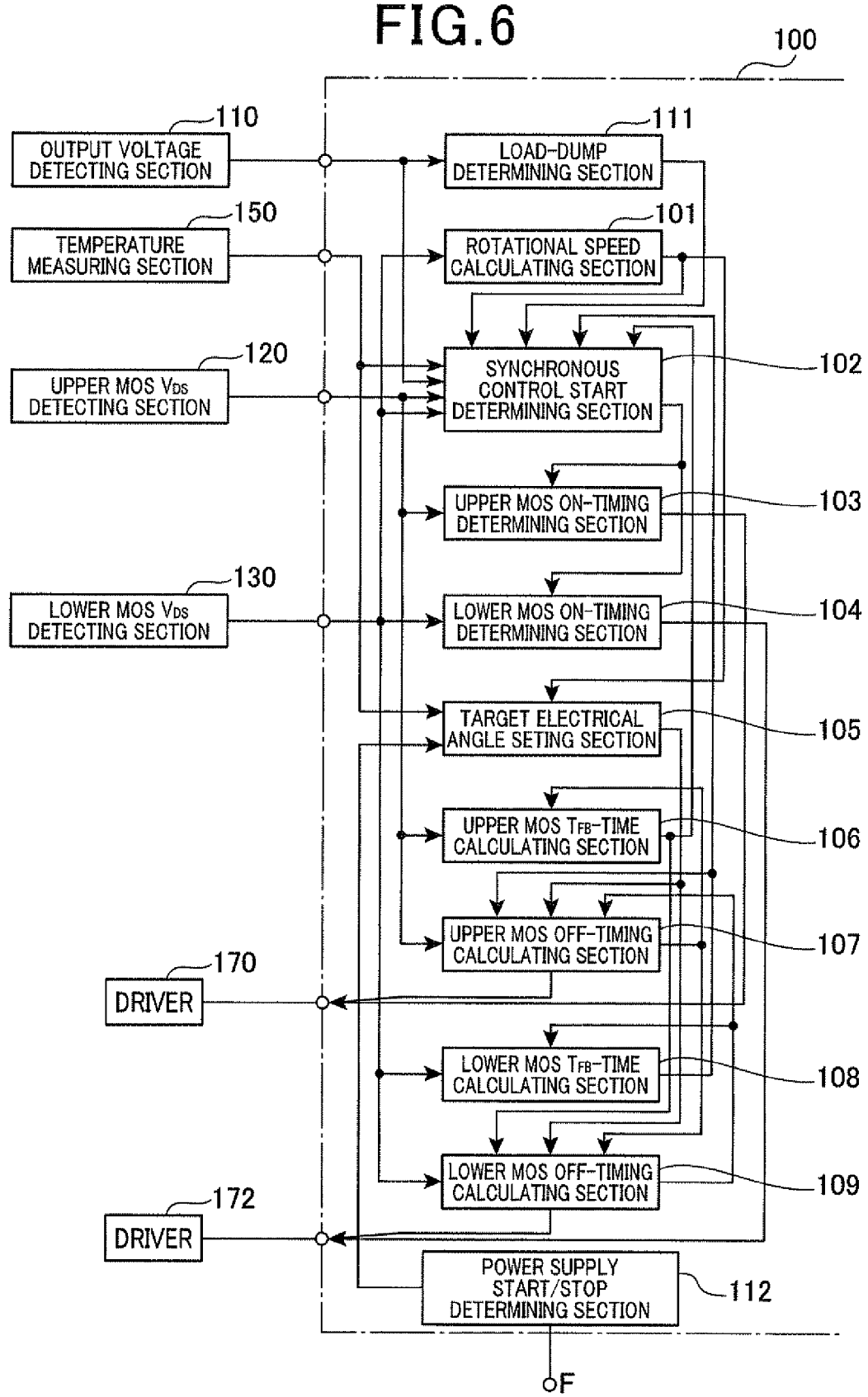
FIG. 6 is a diagram showing the structure of a control section included in the control circuit.

FIG. 6 is a diagram showing the detailed structure of the control section 100. As shown in FIG. 6, the control section 100 includes a rotational speed calculating section 101, a synchronous control start determining section 102, an upper MOS on-timing determining section 103, a lower MOS on-timing determining section 104, a target electrical angle setting section 105, an upper MOS $T_{FB}$-time calculating section 106, an upper MOS off-timing calculating section 107, a lower MOS $T_{FB}$-time calculating section 108, a lower MOS off-timing calculating section 109, a load dump determining section 111 and a power supply activation/deactivation determining section 112. The above components are implemented by operation programs stored in a memory which are read and executed by a CPU in synchronization with a clock signal generated by a clock generating circuit.

Next, the operation of the rectifier module 5X having the above described structure is explained.

(1) Determination of Activation/Deactivation of the Power Supply:

The power supply activation/deactivation determining section 112 monitors a PWM signal (excitation current) supplied to the field winding 4 through the F-terminal of the power generation control device 7, and commands the power supply 160 to start operation when the PWM signal continues to be outputted for more than 30 micro seconds, and to stop operation when the PWM signal continues to be interrupted for more than 1 second. Since the rectifier module 5X starts to operate when the excitation current starts to be supplied to the field winding 4, and stops operation when supply of the excitation current is stopped, that is since the rectifier module 5X operates only when the vehicle generator generates power, it is possible to suppress unnecessary consumption of electric power.

Figure 7:
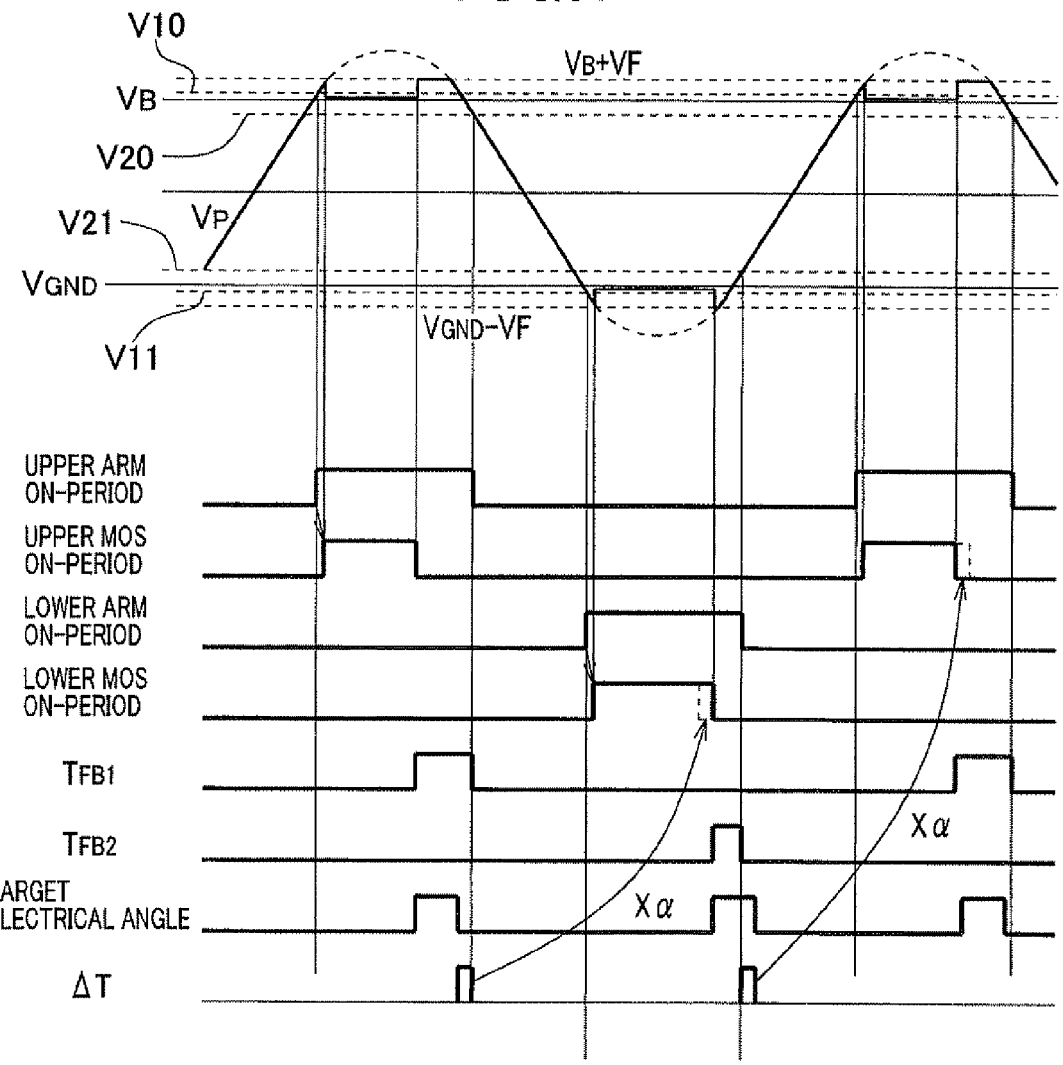
FIG. 7 is a timing diagram of synchronous rectification control performed by the control section.

(2) Synchronous Control Operation:

FIG. 7 is a timing diagram of the synchronous rectification control performed by the control section 100. In FIG. 7, "UPPER ARM ON-PERIOD" represents the output signal of the upper MOS $V_{DS}$ detecting section 120, "UPPER MOS ON-PERIOD" represents the on/off timing of the high-side MOS transistor 50, "LOWER ARM ON-PERIOD" represents the output signal of the lower MOS $V_{DS}$ detecting section 130, and "LOWER MOS ON-PERIOD" represents the on/off timing of the low-side MOS transistor 51.

The upper MOS on-timing determining section 103 monitors the output signal (upper arm on-period) of the upper MOS $V_{DS}$ detecting section 120, determines a rise from the low level to the high level of this output signal as an on timing of the high-side MOS transistor 50, and sends an on command to the driver 170 at this moment. The driver 170 turns on the MOS transistor 50 in accordance with this on command.

The upper MOS off-timing calculating section 107 determines the time a predetermined time after when the MOS transistor 50 is turned on as an off timing of the MOS transistor 50, and sends an off command to the driver 170 at this moment.
The driver 170 turns off the MOS transistor 50 in accordance with this off command.

The above predetermined time is variably set at every moment in order that the off timing becomes earlier than the timing at which the upper arm on-period (the timing at which the output signal of the upper MOS $V_{DS}$ detecting section 120 falls from the high level to the low level) ends by a target electrical angle.

The target electrical angle is a margin to ensure that the off timing of the MOS transistor 50 is not later than the end timing of a diode conduction period when there is performed diode rectification in which the rectification is performed using the diode while keeping the MOS transistor 50 off.
The target electrical angle setting section 105 sets the target electrical angle depending on the rotational speed calculated by the rotational speed calculating section 101. The target electrical angle is set to a larger value in a low speed range and a high speed range, and to a smaller value in a medium speed range as described later.

The rotational speed calculating section 101 calculates the rotational speed based on the rising period or falling period of the output signal of the lower MOS $V_{DS}$ detecting section 130. Using the output signal of the lower MOS $V_{DS}$ detecting section 130 makes it possible to reliably calculate the rotational speed of the vehicle generator 1 irrespective of variation of the output voltage $V_B$ of the vehicle generator 1.

The lower MOS on-timing determining section 104 monitors the output signal (lower arm on-period) of the lower MOS $V_{DS}$ detecting section 130, determines a rise from the low level to the high level of this output signal as an on timing of the low-side MOS transistor 51, and sends an on command to the driver 172 at this moment. The driver 172 turns off the MOS transistor 51 in accordance with this on command.

The lower MOS off-timing calculating section 109 determines the time a predetermined time after when the MOS transistor 51 is turned on as an off timing, and sends an off command to the driver 172 at this moment. The driver 172 turns off the MOS transistor 51 in accordance with this off command.

The above predetermined time is variably set at every moment in order that the off timing is earlier than the timing at which the lower arm on-period (the timing at which the output signal of the lower MOS $V_{DS}$ detecting section 130 falls from the high level to the low level) ends by a target electrical angle.

The target electrical angle is a margin to ensure that the off timing of the MOS transistor 51 is not later than the end timing of a diode conduction period when there is performed diode rectification in which the rectification is performed using the diode while keeping the MOS transistor 51 off. The target electrical angle setting section 105 sets the target electrical angle depending on the rotational speed calculated by the rotational speed calculating section 101.

Actually, since the end timing of the upper or lower arm on-period is unknown at the moment when the MOS transistor 50 or 51 is turned off, the upper MOS off-timing calculating section 107 and the lower MOS off-timing calculating section 109 increase the accuracy of setting of the off timings of the MOS transistors 50 and 51 by feedback of data obtainable a half cycle earlier.

For example, the off timing of the high-side MOS transistor 50 is set in the following way. The lower MOS $T_{FB}$-time calculating section 108 calculates the time $T_{FB2}$ in electrical (see FIG. 7) from the moment when the low-side MOS transistor 51 was turned off a half cycle ago to the moment when the lower arm on-period has ended, and the upper MOS off-timing calculating section 107 calculates a time difference $\Delta T$ by cutting the time $T_{FB2}$ by the target electrical angle. When the rotational speed is stable, since the time $T_{FB2}$ is equal to the target electrical angle, the time difference $\Delta T$ is 0. However, the time difference $\Delta T$ is likely to be unequal to 0 for various factors including (A): variation of the rotational speed due to acceleration or deceleration of the vehicle, (B): pulsation of engine rotation, (C): variation of electrical load, (D): variation of the period of an operation clock used for the CPU to execute programs to implement the various functions of the control section 100 and (E): turn-off delay from when the command to turn off the MOS transistor 50 or 51 is outputted to the driver 170 or 172 to when the MOS transistor 50 or 51 is actually turned off.

Accordingly, the upper MOS off-timing calculating section 107 corrects the lower MOS on-period used by the lower MOS off-timing calculating section 109 a half cycle ago based on the time difference $\Delta T$ in setting the upper MOS on-period to determine the off timing of the MOS transistor 50. More specifically, the upper MOS on-period is set in accordance with the following expression, where $\alpha$ is a correction coefficient.

Upper MOS on-period=Lower MOS on-period a half cycle ago+$\Delta T \times \alpha$.

Likewise, the off timing of the low-side MOS transistor 51 is set in the following way. The upper MOS $T_{FB}$-time calculating section 106 calculates the time in electrical angle $T_{FB1}$ in electrical angle (see FIG. 7) from the moment when the high-side MOS transistor 50 was turned off a half cycle ago to the moment when the upper arm on-period ends, and the lower MOS off-timing calculating section 109 calculates a time difference $\Delta T$ by cutting the time $T_{FB1}$ by the target electrical angle. The lower MOS off-timing calculating section 109 corrects the upper MOS on-period used by the upper MOS off-timing calculating section 107 a half cycle ago based on the time difference $\Delta T$ in setting the lower MOS on-period to determine the off timing of the MOS transistor 51. More specifically, the lower MOS on-period is set in accordance with the following expression, where $\alpha$ is a correction coefficient.

Lower MOS on-period=Upper MOS on-period a half cycle ago+$\Delta T \times \alpha$.

In the way described above, the high-side MOS transistor 50 and the low-side MOS transistor 51 are turned on and off alternately in the same period as that in the diode rectification, to perform the low-loss rectification using the MOS transistors 50 and 51.

(3) Method of Setting the Target Electrical Angle:

Next, a method for setting the target electrical angle is explained. The target electrical angle is set to a value depending on the rotational speed, because the minimum value of the target electrical angle necessary to perform the synchronous rectification control such that the off timing of each of the MOS transistors 50 and 51 is not later than the time at which the upper or lower arm on-period ends depends on the rotational speed. More specifically, the target electrical angle is variably set depending on the rotational speed, because the time difference ΔT is likely to be unequal to 0, for various factors including (A): variation of the rotational speed due to acceleration or deceleration of the vehicle, (B): pulsation of engine rotation, (C): variation of electrical load, (D): variation of the period of an operation clock used for the CPU to execute programs to implement the various functions of the control section 100 and (E): turn-off delay from when the command to turn off the MOS transistor 50 or 51 is outputted to the driver 170 or 172 to when the MOS transistor 50 or 51 is actually turned off, as explained in the foregoing.

Figure 8:
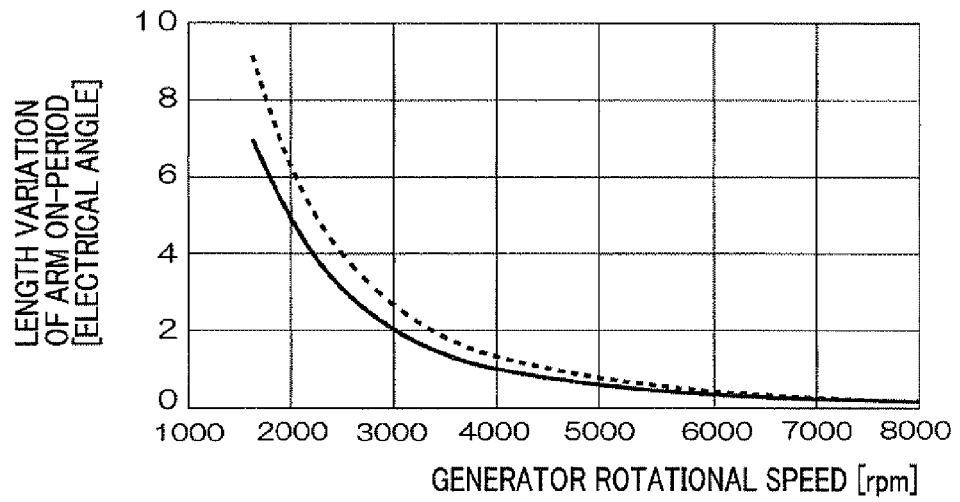
FIG. 8 is a diagram showing an example of variation in electrical angle of an upper arm on-period and a lower arm on-period of the vehicle generator when the vehicle accelerates sharply.

FIG. 8 shows an example of variation in electrical angle of the length of the upper arm on-period and lower arm on-period when the vehicle accelerates rapidly, that is when the rotation speed increases rapidly (corresponding to the above factor (A)). In FIG. 8, the horizontal axis represents the rotational speed of the vehicle generator 1, and the vertical axis represents variation in electrical angle of the length of the upper arm on-period and lower arm on-period when the rotational speed of the vehicle generator 1 rises from 2000 rpm to 6000 rpm in one second. In FIG. 8, the solid line shows a case where the vehicle generator 1 has an 8-pole rotor, and the dotted line shows a case where the vehicle generator 1 has a 6-pole rotor.

As shown in FIG. 8, the variation of the on-period expressed in electrical angle increases with the decrease of the rotational speed, and decreases with the increase of the rotational speed. Accordingly, the target electrical angle has to be set to a larger value when the rotational speed is lower, and to a smaller value when the rotational speed is higher.

FIG. 9 is a diagram showing an example of variation in electrical angle of the length of the upper arm on-period and lower arm on-period when the engine speed pulsates (corresponding to the above factor (B)). In FIG. 9, the horizontal axis represents the rotational speed of the vehicle generator 1, and the vertical axis represents variation in electrical angle of the length of the upper arm on-period and lower arm on-period when the engine speed varies by ±40 rpm assuming that the generator pulley ratio is 2.5. In FIG. 9, the solid line shows a case where the vehicle generator 1 has an 8-pole rotor, and the dotted line shows a case where the vehicle generator 1 has a 6-pole rotor.

As shown in FIG. 9, the variation of the on-period expressed in electrical angle increases with the decrease of the rotational speed, and decreases with the increase of the rotational speed. Accordingly, the target electrical angle has to be set to a larger value when the rotational speed is lower, and to a smaller value when the rotational speed is higher.

FIG. 10 is a diagram showing an example of variation in electrical angle of the length of the upper arm on-period and lower arm on-period when the electrical load changes rapidly (corresponding to the above factor (C)). In FIG. 10, the horizontal axis represents the rotational speed of the vehicle generator 1, and the vertical axis represents variation in electrical angle of the length of the upper arm on-period and lower arm on-period when the electrical load device 10 of 50 A is shut off causing the output voltage $V_B$ to change to 13.5 to 14.0 V. In FIG. 10, the solid line shows a case where the vehicle generator 1 has an 8-pole rotor, and the dotted line shows a case where the vehicle generator 1 has a 6-pole rotor.

As shown in FIG. 10, the variation of the length of the on-period expressed in electrical angle increases with the decrease of the rotational speed, and decreases with the increase of the rotational speed. Accordingly, the target electrical angle has to be set to a larger value when the rotational speed is lower, and to a smaller value when the rotational speed is higher.

FIG. 11 is a diagram showing an example of variation in electrical angle of the length of the upper arm on-period and lower arm on-period when there is turn-off delay in the drivers 170 and 172 (corresponding to the above factor (E)). In FIG. 11, the horizontal axis represents the rotational speed of the vehicle generator 1, and the vertical axis represents variation in electrical angle of the length of the upper arm on-period and lower arm on-period when there is turn-off delay of 15 µs between the moment when the driver 170 or 172 is commanded to turn off the MOS transistor 50 or 51 and the moment when the MOS transistor 50 or 51 is actually turned off. In FIG. 11, the solid line shows a case where the vehicle generator 1 has an 8-pole rotor, and the dotted line shows a case where the vehicle generator 1 has a 6-pole rotor.

As shown in FIG. 11, the variation of the on-period expressed in electrical angle decreases with the decrease of the rotational speed, and increases with the increase of the rotational speed. Accordingly, the target electrical angle has to be set to a smaller value when the rotational speed is lower, and to a larger value when the rotational speed is higher.

Other than the above, variation of the clock cycle has to be taken into account (corresponding to the above factor (D)). For example, when a system clock of 2 MHz having accuracy of ±beta % is used, that is, when the clock cycle exhibits variation of beta %, variation of each of the upper arm on-period and the lower arm on-period increases with the increases of the rotational speed and decreases with the decreases of the rotational speed. This is because the accuracy of the clock is unrelated to the rotational speed, however, the variation of the clock makes up a larger proportion of the variation of the on-period when the rotational speed is larger, because the time period of one cycle in electrical angle of the phase voltage $V_P$ decreases with the increase of the rotational speed. Accordingly, the target electrical angle has to be set to a smaller value when the rotational speed is lower, and to a larger value when the rotational speed is higher.

Figure 12:
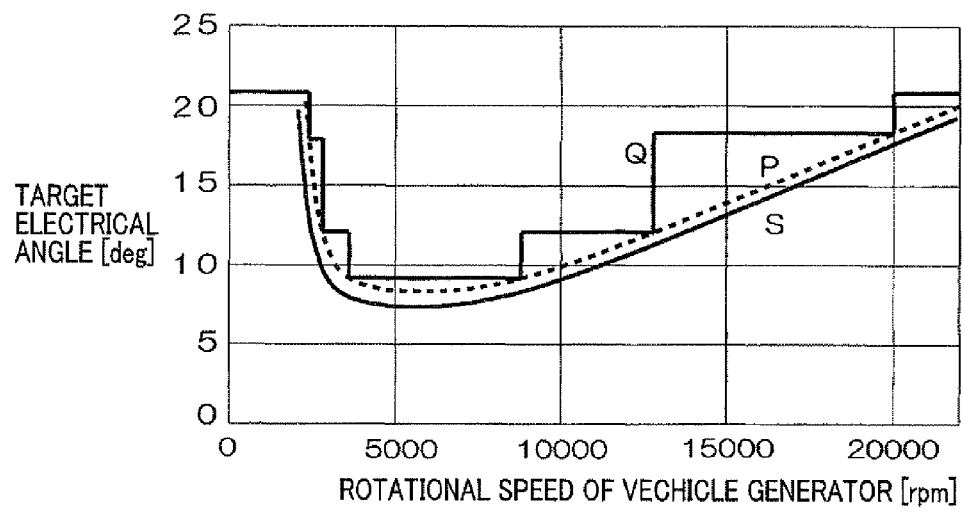
FIG. 12 is a diagram showing an example of variation in electrical angle of the upper arm on-period and the lower arm on-period of the vehicle generator due to a combination of the various factors.

FIG. 12 is a diagram showing an example of variation in electrical angle of the length of the upper arm on-period and lower arm on-period due to a combination of the various factors (A) to (E). In FIG. 12, the horizontal axis represents the rotational speed of the vehicle generator 1, and the vertical axis represents an integrated value of the variation in electrical angle of the length of the upper arm on-period and lower arm on-period due to the combination of the various factors (A) to (E). In FIG. 12, the line S shows a case where the rotor is an 8-pole rotor.

As seen from FIG. 12, when the various factors (A) to (E) are combined, the variation in electrical angle of the on-period is larger in the low speed range and high speed range, and smaller in the medium speed range. Accordingly, the target electrical angle setting section 105 sets the target electrical angle to a larger value in the low speed range and high speed range, and to a smaller value in the medium speed range. In FIG. 12, the lines P and Q show the target electrical angle set in the above way. More specifically, the line P shows the target electrical angle set such that it varies continuously in accordance with the rotational speed. In this case, it is possible to set the minimum value of the target electrical angle in accordance with the rotational speed. The line Q shows the target electrical angle set such that it varies stepwise in accordance with the rotational speed. In this case, it is possible to simplify the structure necessary to variably set the target electrical angle, because a plurality of values of the target electrical angle corresponding to various values of the rotational speed can be stored in advance in the form of a map, for example.

(4) Method for Setting the Correction Coefficient α:

Next, a method for setting the correction coefficient α is explained. In this embodiment, the time difference ΔT, which is the time $T_{FB1}$ from when the MOS transistor 50 is turned off to when the upper arm on-period ends minus the target electrical angle, or the time $T_{FB2}$ from when the MOS transistor 51 is turned off to when the lower aim on-period ends minus the target electrical angle, is compared with a normal range of the time difference ΔT (the range within which the time difference ΔT may vary in the normal state). If the time difference is within the normal range, that is if the time difference ΔT is smaller than an upper limit $T_{E/G}$ of this normal range, the correction coefficient α is set to a smaller value, and otherwise set to a larger value.

Setting the correction coefficient α differently depending on whether the time difference ΔT is within the normal range or not makes it possible to properly set the off timings of the MOS transistors 50 and 51 while estimating the state of the next conduction period based on the vehicle state, such as presence of acceleration of the vehicle or abrupt change of the electrical load.

The above normal range is a range of variation of the conduction period within which the conduction period is assumed to be in absence of the vehicle driver's operation. More specifically, the above normal range is a range of variation of the conduction period due to the foregoing factors (B): pulsation of engine rotation, (D): variation of the operation clock, and (B): turn-off delay of MOS transistors. The factors (A): variation of the rotational speed due to acceleration or deceleration of the vehicle and (C): variation of electrical load can be assumed as disturbances resulting from the vehicle driver's operation, such as depression of the accelerator pedal, or turning on or off of an electrical device. According to this embodiment, since the range of variation of the conduction period due to the factors not resulting from the vehicle driver's operation is set as the normal range, it is possible to reliably bring the off timings of the MOS transistors 50 and 51 to the timings corresponding to the target electrical angle when the conduction period is varied due to such disturbances.

Figure 13:
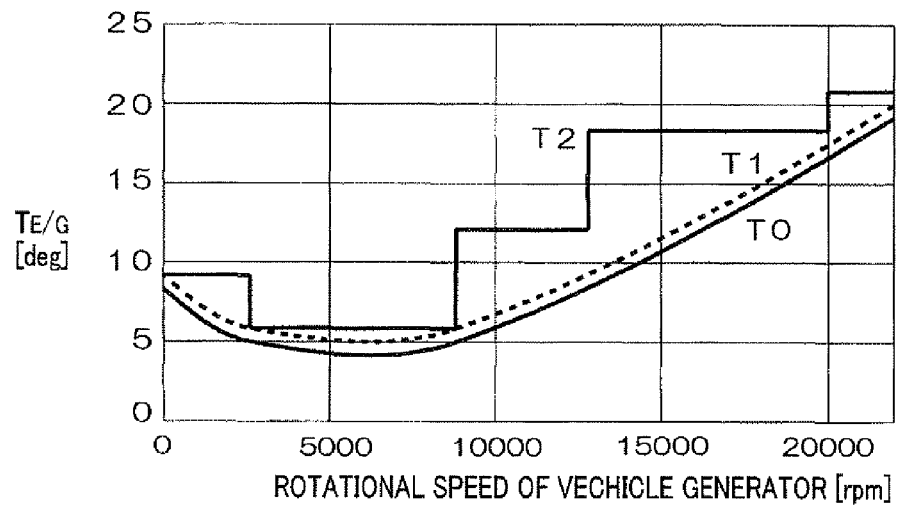
FIG. 13 is a diagram showing an example of variation of the upper limit $T_{E/G}$ of the time difference $\Delta T$ in the normal state defined in the rectifier module of this embodiment due to a combination of some of the various factors.

FIG. 13 is a diagram showing an example of variation of the upper limit $T_{E/G}$ in the normal state due to a combination of the factors (B), (D) and (E). In FIG. 13, the horizontal axis represents the rotational speed of the vehicle generator 1, and the vertical axis represents variation in electrical angle of the $T_{E/G}$. In FIG. 13, the line TO shows a case where the rotor is an 8-pole rotor.

Preferably, the normal range is set such that it is wider when the rotational speed is detected to be within the high speed range or low speed range, and narrower when the rotational speed is detected to be within the medium speed range. In this case, the normal range may be set continuously or stepwise depending on the rotational speed.

As seen from FIG. 13, when the factors (B), (D) and (E) are combined, variation in electrical angle of the $T_{E/G}$ is larger in the low speed range and high speed range, and smaller in the medium speed range. The upper MOS off-timing calculating section 107 and the lower MOS off-timing calculating section 109 set the $T_{E/G}$ to a larger value in the low and high speed ranges, and to a smaller value in the medium speed range. In FIG. 13, the lines T1 and T2 show the values of the $T_{E/G}$ set in the above way. More specifically, the line T1 shows a case where the $T_{E/G}$ is set to vary continuously depending on the rotational speed. In this case, it is possible to set the minimum value of the $T_{E/G}$ depending on the rotational speed. The line T2 shows a case where the $T_{E/G}$ is set to vary stepwise depending on the rotational speed. In this case, it is possible to simplify the structure necessary to variably set the $T_{E/G}$, because a plurality of values of the $T_{E/G}$ corresponding to various values of the rotational speed can be stored in advance in the form of a map, for example.

FIG. 14 is a diagram showing examples of setting of the correction coefficient α. FIG. 14 shows four cases (Case 1 to Case 4) in accordance with whether the sign of the time difference ΔT is positive or negative, and whether the absolute value of the ΔT is larger or smaller than the $T_{E/G}$.

Case 1 is a case where the ΔT is positive (where the target electrical angle is smaller than the $T_{FB1}$ or $T_{FB2}$), and the ΔT is larger than the $T_{E/G}$. Case 1 occurs when the vehicle decelerates abruptly, or the electrical load increases abruptly causing the $T_{FB1}$ and $T_{FB2}$ to increase abruptly, for example. In Case 1, the upper MOS off-timing calculating section 107 sets, as a corrected off timing of the MOS transistor 50, the ΔT×1.0-delayed version of the off timing of the MOS transistor 51 determined by the lower MOS off-timing calculating section 109 a half-cycle ago. Likewise, the lower MOS off-timing calculating section 109 sets, as a corrected off timing of the MOS transistor 51, the ΔT×1.0-delayed version of the off timing of the MOS transistor 50 determined by the upper MOS off-timing calculating section 107 a half-cycle ago.

Case 2 is a case where the ΔT is positive (when the target electrical angle is smaller than the $T_{FB1}$ or the $T_{FB2}$), and the ΔT is smaller than or equal to the $T_{E/G}$. Case 2 occurs when the vehicle does not decelerate or accelerate abruptly, the electrical load does not change abruptly, and accordingly variations of the $T_{FB1}$ and $T_{FB2}$ are small. In Case 2, the upper MOS off-timing calculating section 107 sets, as a corrected off timing of the MOS transistor 50, the ΔT×0.75-delayed version of the off timing of the MOS transistor 51 determined by the lower MOS off-timing calculating section 109 a half-cycle ago. Likewise, the lower MOS off-timing calculating section 109 sets, as a corrected off timing of the MOS transistor 51, the ΔT×0.75-delayed version of the off timing of the MOS transistor 50 determined by the upper MOS off-timing calculating section 107 a half-cycle ago.

Case 3 is a case where the ΔT is negative (where the target electrical angle is larger than the $T_{FB1}$ or the $T_{FB2}$), and the ΔT is larger than or equal to the $-T_{E/G}$. Case 3 occurs when the vehicle does not decelerate or accelerate abruptly, the electrical load does not change abruptly, and accordingly variations of the $T_{FB1}$ and $T_{FB2}$ are small like in Case 2. In Case 3, the upper MOS off-timing calculating section 107 sets, as a corrected off timing of the MOS transistor 50, the ΔT×1.0-advanced version of the off timing of the MOS transistor 51 determined by the lower MOS off-timing calculating section 109 a half-cycle ago. Likewise, the lower MOS off-timing calculating section 109 sets, as a corrected off timing of the MOS transistor 51, the ΔT×1.0-advanced version of the off timing of the MOS transistor 50 determined by the upper MOS off-timing calculating section 107 a half-cycle ago.

Case 4 is a case where the ΔT is negative (where the target electrical angle is larger than the $T_{FB1}$ or the $T_{FB2}$), and the ΔT is smaller than the $-T_{E/G}$. Case 4 occurs when the vehicle accelerates abruptly, or the electrical load decreases abruptly causing the $T_{FB1}$ and $T_{FB2}$ to decrease abruptly, for example. In Case 4, the upper MOS off-timing calculating section 107 sets, as a corrected off timing of the MOS transistor 50, the Δt×1.25-advanced version of the off timing of the MOS transistor 51 determined by the lower MOS off-timing calculating section 109 a half-cycle ago. Likewise, the lower MOS off-timing calculating section 109 sets, as a corrected off timing of the MOS transistor 51, the ΔT×1.25-advanced version of the off timing of the MOS transistor 50 determined by the upper MOS off-timing calculating section 107 a half-cycle ago.

As explained above, in this embodiment, since the next off timing of the switching element 51 or 50 is set to the previous off timing (the off timing a half-cycle ago) of the switching element 51 or 50 plus the time difference ΔT multiplied by the correction coefficient α, and the correction coefficient α is set such that its value is larger when the absolute value of the time difference ΔT is larger than the $T_{E/G}$ than when the absolute value of the time difference ΔT is smaller than the $T_{E/G}$. This makes it possible to correct the off timing of the switching element 50 or 51 promptly when it is deviated significantly from the timing corresponding to the target electrical angle.

Further, the correction coefficient is set such that its value is larger when the time difference ΔT is negative than when the time difference ΔT is positive. By setting the correction coefficient α to a larger value when the time difference ΔT is negative, that is, when the diode conduction period is shorter, it is possible to prevent the MOS transistors 50 and 51 from being turned off at a timing later than the timing at which the diode conduction period ends.

By varying the $T_{E/G}$ continuously, it is possible to set the minimum value of the $T_{E/G}$ depending on the rotational speed. On the other hand, by varying the $T_{E/G}$ stepwise, it is possible to simplify the structure necessary to variably set the $T_{E/G}$.

According to the above embodiment, since the target electrical angle is variably set depending on the rotational speed to ensure and shorten a period from when the MOS transistor 50 or 51 is turned off to when a current starts to flow through the diode, it is possible to reduce the loss of the diode rectification to thereby increase the power generation efficiency of the vehicle generator 1. Especially, by setting the target electrical angle to a larger value in the low and high speed ranges, and to a smaller value in the medium speed range, it s possible to reduce the loss and increase the power generation efficiency in each of the respective speed ranges.

Further, by continuously varying the target electrical angle, it is possible to set the minimum value of the target electrical angle depending on the rotational speed, to thereby minimize the loss and maximize the power generation efficiency. Further, by varying the target electrical angle stepwise, it is possible to simplify the structure necessary to variably set the target electrical angle.

In the above embodiment, the value of the target electrical angle is variably set in accordance with the rotational speed. However, the target electrical angle may be variably set in accordance with a combination of the rotational speed and the temperature or the output current, as described below.

Generally, variation of the period of a clock generated by a clock generator increases with increase of the temperature. In a case where a clock generator is incorporated in the rectifier module 5X, the temperature detected by the temperature detecting section 150 can be assumed to indicate the temperature of the clock generator. If the target electrical angle setting section 105 sets the target electrical angle to a larger value when the temperature detected by the temperature detecting section 150 is higher and the target electrical angle increases with the increase of the rotational speed, and to a smaller value when the temperature detected by the temperature detecting section 150 is lower, the value of the target electrical angle can be set more properly taking into account the effect of the temperature to thereby further reduce the loss and further improve the efficiency of the power generation.

Figure 15:
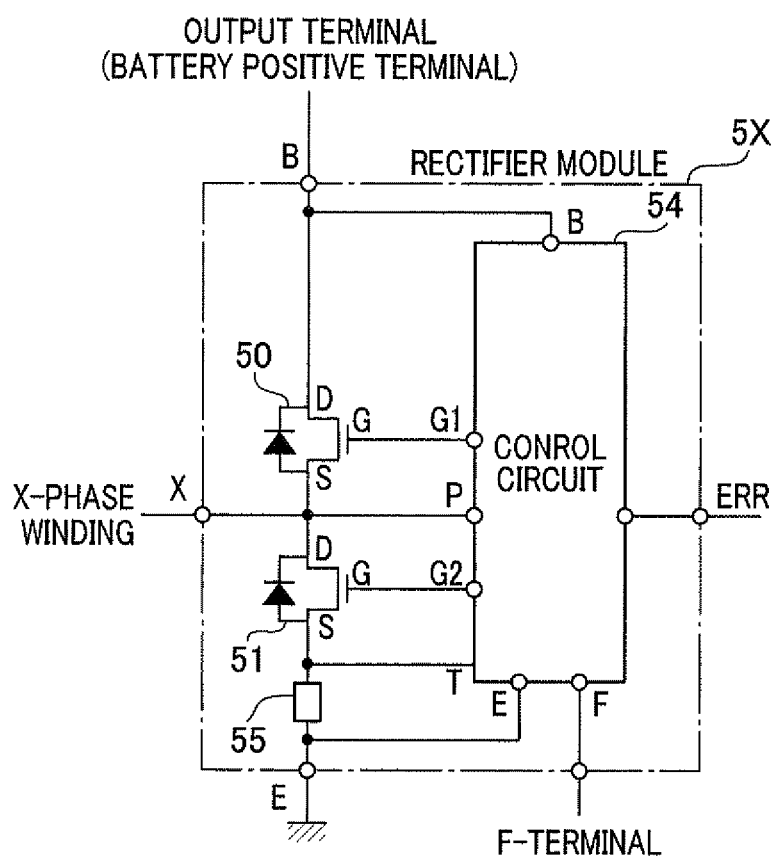
FIG. 15 is a diagram showing the structure of a modification of the rectifier module of this embodiment.
Figure 16:
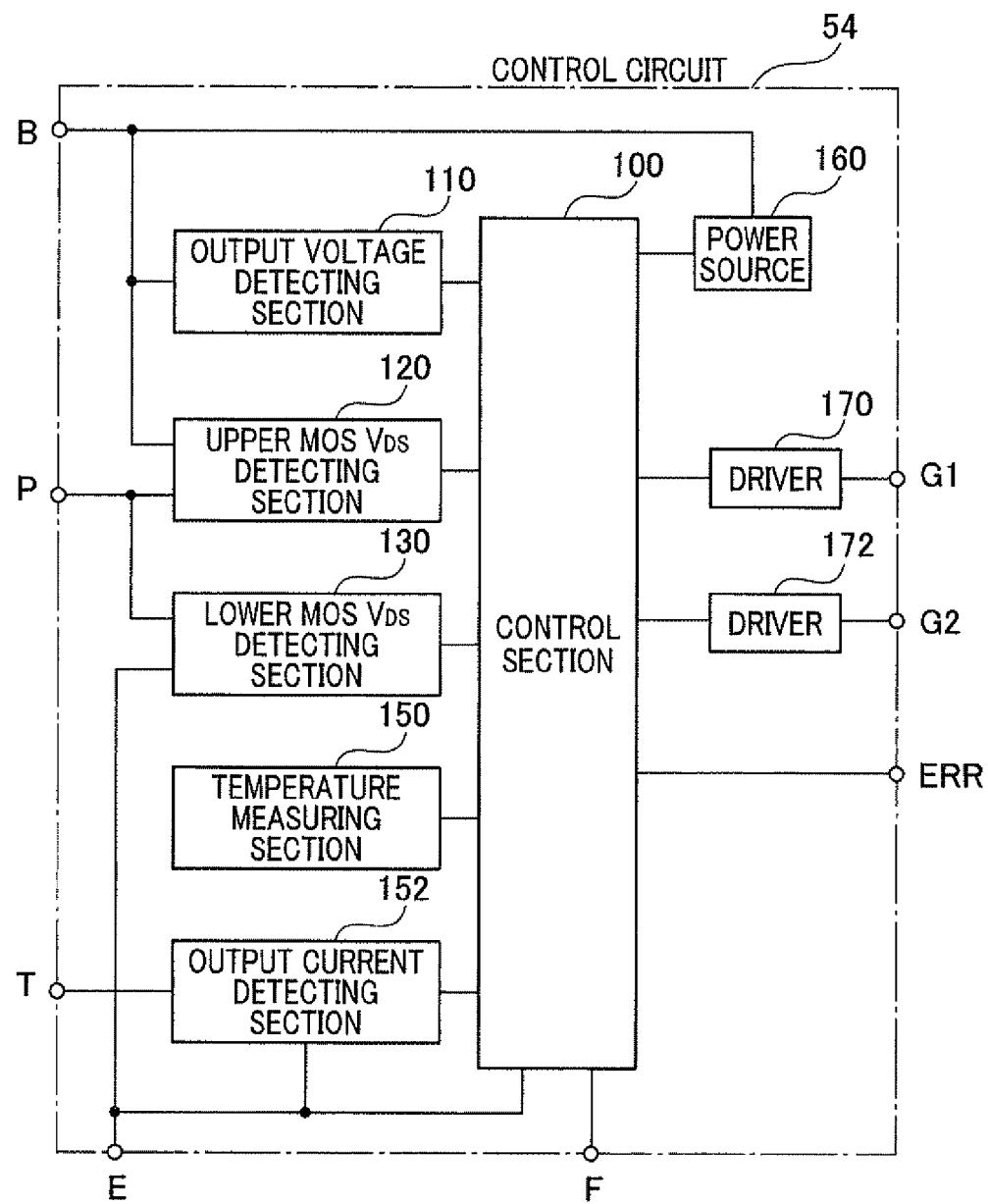
FIG. 16 is a diagram showing the structure of a modification of the control circuit included in the rectifier module of this embodiment.

Generally, rise and fall of the phase voltage $V_P$ become steeper with the increase of the output current, and become gentler with the decrease of the output current. As explained above, the timing at which the upper arm on-period ends and the timing at which a current stops flowing through the diode parallel-connected to the MOS transistor 50 are different from each other. This difference is larger when the output current is smaller and accordingly rise and fall of the phase voltage $V_P$ are gentler. If the target electrical angle setting section 105 sets the target electrical angle to a larger value when the output current is smaller, and to a smaller value when the output current is larger, the value of the target electrical angle can be set more properly taking into account the effect of variation of the output current, to thereby further improve the efficiency of the power generation. The magnitude of the output current can be detected based on the on-duty ratio of the PWM signal supplied to the field winding 4 through the F-terminal of the power generation control device 7. Alternatively, the magnitude of the output current may be detected based on the voltage across a current detecting resistor connected between the source of the MOS transistor 51 and the negative terminal of the battery 9. FIG. 15 is a diagram showing the structure of the control circuit 54 modified to include a current detecting section 152 configured to detect the magnitude of the output current based on the voltage across the current detecting resistor 55. It is also possible to detect the magnitude of the output current by detecting the magnitude of the current flowing through the charge line 12 or the output terminal using a current sensor.

It is a matter of course that various modifications can be made to the above described embodiment as described below. The target electrical angle setting section 105 may be configured to increase the value of the target electrical angle if there is increase in the frequency that the timing at which the MOS transistor 50 or 51 is turned off is later than the timing at which the conduction period (the upper or lower arm on-period) ends. This makes it possible to make a change to the control in order to reduce the frequency that the timing at which the MOS transistor 50 or 51 is turned off is later than the timing at which the conduction period ends for some reason.

In the above embodiment, the $T_{E/G}$ is set to a larger value in the low and high speed ranges, and to a smaller value in the medium speed range. However, the $T_{E/G}$ may be set differently between the low speed range and the medium speed range, or between the medium speed range and the high speed range.

More specifically, the upper MOS off-timing calculating section 107 and the lower MOS off-timing calculating section 109 may be configured to set the $T_{E/G}$ to a larger value when the rotational speed calculated by the rotational speed calculating section 101 is within the low speed range, and to a smaller value when the calculated rotational speed is within the medium speed range. In this case, the value of the $T_{E/G}$ may be increased with the increase of the rotational speed in the high speed range as shown in FIG. 13.

Alternatively, the upper MOS off-timing calculating section 107 and the lower MOS off-timing calculating section 109 may be configured to set the $T_{E/G}$ to a larger value when the rotational speed calculated by the rotational speed calculating section 101 is within the high speed range, and to a smaller value when the calculated rotational speed is within the medium speed range. In this case, the value of the target electrical angle may be increased with the increase of the rotational speed in the low speed range as shown in FIG. 13.

In the above embodiment, the target electrical angle is set to a larger value in the low and high speed ranges, and to a smaller value in the medium speed range. However, the target electrical angle may be set differently between the low speed range and the medium speed range, or between the medium speed range and the high speed range.

More specifically, the target electrical angle setting section 105 may be configured to set the target electrical angle to a larger value when the rotational speed calculated by the rotational speed calculating section 101 is within the low speed range, and to a smaller value when the calculated rotational speed is within the medium speed range. This makes it possible to set the target electrical angle properly depending on the rotational speed to achieve low loss and high efficiency of power generation up to the medium speed range. In this case, the value of the target electrical angle may be increased with the increase of the rotational speed in the high speed range as shown in FIG. 12.

Alternatively, the target electrical angle setting section 105 may be configured to set the target electrical angle to a larger value when the rotational speed calculated by the rotational speed calculating section 101 is within the high speed range, and to a smaller value when the calculated rotational speed is within the medium speed range. This makes it possible to set the target electrical angle properly depending on the rotational speed to achieve low loss and high efficiency of power generation above the medium speed range. In this case, the value of the target electrical angle may be increased with the increase of the rotational speed in the low speed range as shown in FIG. 12.

In the above embodiment, the vehicle generator 1 includes the two stator windings 2 and 3, and two rectifier module groups 5 and 6. However, the present invention is applicable to a vehicle generator including one stator winding and one rectifier module group.

The above embodiment is configured to perform rectification (power generation) using the rectifier modules. However, the present invention is applicable to a case where the vehicle generator 1 can function as a motor by changing the on/off timings of the MOS transistors 50 and 51 in order that a DC current supplied from the battery 9 is converted to an AC current and supplied to the stator windings 2 and 3.

In the above embodiment, each of the two rectifier module groups 5 and 6 includes the three rectifier modules. However, the number of the rectifier modules included in each rectifier module may be other than three.

The above explained preferred embodiments are exemplary of the invention of the present application which is described solely by the claims appended below. It should be understood that modifications of the preferred embodiments may be made as would occur to one of skill in the art.

What is claimed is:

1. A vehicle-use electric rotating machine comprising:
an armature winding including two or more phase windings;
a switching section having a bridge circuit for rectifying a voltage induced in the armature winding, the bridge circuit including, for each of the phase windings, an upper arm and a lower arm each constituted of a switching element parallel-connected with a diode;
a rotational speed calculating section for calculating a rotational speed of the electric rotating machine;
an on timing setting section for setting an on timing of the switching element;
a target electrical angle setting section configured to set a value of a target electric angle, the target electrical angle representing in electrical angle a margin period between a time at which the switching element is turned off and a time at which a conduction period ends, the conduction period representing a period from when a phase voltage of one of the phase windings reaches a first threshold voltage to when the phase voltage reaches a second threshold voltage different from the first threshold voltage,
an off timing setting section configured to set an off timing of the switching element such that the margin period is equivalent to the set value of the target electrical angle; and
a switching element driving section configured to drive each of the switching elements such that the switching element is turned on at the timing set by the on timing setting section and turned off at the off timing set by the off timing setting section,
wherein
when a time difference represents a first electrical angle minus the target electrical angle, the first electrical angle representing a period in electrical angle from the previous off timing of the switching element to when the phase voltage has reached the second threshold voltage,
the off timing setting section corrects, for each of the switching elements, the off timing of the switching element by a correction amount depending on the time difference,
the off timing setting section being configured to set the correction amount to a larger value when the time difference is detected to be outside a normal range than when the time difference is detected to be within the normal range.

2. The vehicle-use generator according to claim 1, wherein the off timing setting section is configured to set the next off timing of the switching element constituting one of the upper and lower arms based on a value of the time difference of the switching element constituting the other of the upper and lower arms.

3. The vehicle-use generator according to claim 1, wherein the normal range is a range of variation of the conduction period due to other than a vehicle driver's operation.

4. The vehicle-use generator according to claim 1, wherein the off timing setting section sets, as the next off timing, the previous off timing plus the time difference multiplied by a correction coefficient, the off timing section being configured to set the correction coefficient to a larger value when the time difference is detected to be outside the normal than when the time difference is detected to be within the normal range.

5. The vehicle-use generator according to claim 4, wherein the correction coefficient is set to a larger value when the time difference is negative than when the time difference is positive.

6. The vehicle-use generator according to claim 1, wherein the off timing setting section is configured to set the normal range based on the rotational speed calculated by the rotational speed calculating section.

7. The vehicle-use generator according to claim 6, wherein the off timing setting section is configured to set the normal range wider when the rotational speed calculated by the rotational speed calculating section is detected to be within a high speed range, and narrower when the rotational speed calculated by the rotational speed calculating section is detected to be within a medium speed range.

8. The vehicle-use generator according to claim 7, wherein the off timing setting section is configured to set the normal range wider when the rotational speed calculated by the rotational speed calculating section is detected to be within a low speed range, and narrower when the rotational speed calculated by the rotational speed calculating section is detected to be within the medium speed range.

9. The vehicle-use generator according to claim 1, wherein the off timing setting section is configured to vary the normal range continuously depending on the rotational speed calculated by the rotational speed calculating section.

10. The vehicle-use generator according to claim 1, wherein the off-timing setting section is configured to vary the normal range stepwise depending on the rotational speed calculated by the rotational speed calculating section.

11. The vehicle-use generator according to claim 1, wherein the target electrical angle setting section is configured to set the value of the target electrical angle based on the rotational speed calculated by the rotational speed calculating section.

12. The vehicle-use generator according to claim 1, further comprising a temperature detecting section for detecting the temperature of the vehicle-use generator,
   the target electrical angle setting section being configured to set the value of the target electrical angle based on the temperature detected by the temperature detecting section.

13. The vehicle-use generator according to claim 1, wherein the target electrical angle setting section is configured to determine the value of the target electrical angle based on a value of an output current of the vehicle-use generator.

14. The vehicle-use generator according to claim 1, wherein the target electrical angle setting section is configured to increase the value of the target electrical angle when there is increase in frequency that the timing at which the switching element is turned off is later than the timing at which the conduction period ends.

* * * * *